(12) United States Patent
Wang et al.

(10) Patent No.: US 11,562,307 B2
(45) Date of Patent: Jan. 24, 2023

(54) VEHICLE PASSENGER FLOW STATISTICAL METHOD, APPARATUS, DEVICE, AND STORAGE MEDIUM

(71) Applicant: APOLLO INTELLIGENT DRIVING TECHNOLOGY (BEIJING) CO., LTD., Beijing (CN)

(72) Inventors: Zijie Wang, Beijing (CN); Yingnan Liu, Beijing (CN); Wenlong Rao, Beijing (CN); Jingjing Xue, Beijing (CN); Yue Wang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 187 days.

(21) Appl. No.: 16/718,016

(22) Filed: Dec. 17, 2019

(65) Prior Publication Data
US 2020/0193347 A1 Jun. 18, 2020

(30) Foreign Application Priority Data
Dec. 17, 2018 (CN) .......................... 201811540092.7

(51) Int. Cl.
*G06Q 10/06* (2012.01)
*G08G 1/133* (2006.01)
(Continued)

(52) U.S. Cl.
CPC ....... *G06Q 10/06315* (2013.01); *G06V 20/59* (2022.01); *G06V 40/172* (2022.01); *G08G 1/133* (2013.01); *H04N 21/2187* (2013.01)

(58) Field of Classification Search
CPC ......... G06Q 10/06315; G06K 9/00832; G06K 9/00845; G06K 9/00778; B60W 40/08;
(Continued)

(56) References Cited

U.S. PATENT DOCUMENTS

2017/0362054 A1* 12/2017 Légeret .................. B66B 5/025
2018/0354535 A1* 12/2018 Cho ........................ G06V 20/53
(Continued)

FOREIGN PATENT DOCUMENTS

CN    104021605 A    9/2014
CN    104244824 A    12/2014
(Continued)

OTHER PUBLICATIONS

A. Phasouliotis, et al. "Intelligent Platform Management," 2016 IEEE International Conference on Intelligent Rail Transportation (ICIRT), 2016, pp. 145-149, doi: 10.1109/ICIRT.2016.7588724 [retrieved on Sep. 17, 2022] <https://ieeexplore.ieee.org/document/7588724?source=IQplus> (Year: 2016).*
(Continued)

*Primary Examiner* — Jerry O'Connor
*Assistant Examiner* — Michael R Koester
(74) *Attorney, Agent, or Firm* — J.C. Patents (57) ABSTRACT

The present disclosure provides a vehicle passenger flow statistical method, including: acquiring, by a server, door opening time and door closing time of a vehicle during any one door opening and closing process of door opening and closing processes in a pending statistical period; acquiring, by the server, a first set of images and a second set of images in a carriage of the vehicle according to the door opening time and the door closing time; and acquiring, by the server, the number of on-board people and the number of off-board people during the door opening and closing process according to the first set of images and the second set of images. The present disclosure can improve efficiency and accuracy of passenger flow statistics according to which an operation plan of the vehicle may be optimized timely and effectively.

11 Claims, 5 Drawing Sheets

(51) Int. Cl.
*H04N 21/2187* (2011.01)
*G06V 20/59* (2022.01)
*G06V 40/16* (2022.01)

(58) Field of Classification Search
CPC .... B60W 50/14; G06F 16/951; A61B 5/0022; B66B 5/0012; B60R 25/25
See application file for complete search history.

(56) References Cited

U.S. PATENT DOCUMENTS

2019/0039634 A1* 2/2019 Tokumaru ............... B61L 27/16
2020/0167697 A1* 5/2020 Tran ....................... G06Q 10/02

FOREIGN PATENT DOCUMENTS

| CN | 105913367 A | | 8/2016 |
|----|-------------|---|--------|
| CN | 108182403 A | | 6/2018 |
| CN | 108509914 A | | 9/2018 |
| KR | 101737738 | * | 5/2017 |
| KR | 101737738 B1 | * | 5/2017 |

OTHER PUBLICATIONS

First Office Action of the priority application.

* cited by examiner

VEHICLE PASSENGER FLOW STATISTICAL METHOD, APPARATUS, DEVICE, AND STORAGE MEDIUM

CROSS-REFERENCE TO RELATED APPLICATIONS

This application claims priority to Chinese Patent Application No. 201811540092.7, filed on Dec. 17, 2018, which is hereby incorporated by reference in its entirety.

TECHNICAL FIELD

The present disclosure relates to the field of communication technologies and, in particular, to a vehicle passenger flow statistical method, an apparatus, a device, and a storage medium.

BACKGROUND

With the congestion of urban traffic and the aggravation of urban pollution, public transportation and green travel have become a travel mode currently advocated by people. The public transportation usually includes a bus, a subway, an electric trolley and the like. In order to optimize public transportation scheduling and operation management, it is usually necessary to perform passenger flow statistics during operation of a vehicle.

In the prior art, a manual statistical method or card-swiping statistics are generally used for vehicle passenger flow statistics, where the manual statistics usually consumes a large amount of manpower and material resources, has a long statistical period and cannot provide real-time data; and the card-swiping statistics cannot take passengers who buy tickets through coins or paper moneys into consideration. Therefore, in the prior art, data for vehicle passenger flow statistics cannot be obtained in time and accurately, and an operation plan of a vehicle cannot be optimized in time according to the passenger flow statistics.

SUMMARY

The present disclosure provides a vehicle passenger flow statistical method, an apparatus, a device and a storage medium to more accurately obtain on-board and off-board situations of passengers during a door opening and closing process of a vehicle, which can improve efficiency and accuracy of passenger flow statistics according to which an operation plan of the vehicle may be optimized timely and effectively.

In a first aspect of the present disclosure, a vehicle passenger flow statistical method is provided, including:

acquiring, by a server, door opening time and door closing time of a vehicle during any one door opening and closing process of door opening and closing processes in a pending statistical period;

acquiring, by the server, a first set of images and a second set of images in a carriage of the vehicle according to the door opening time and the door closing time, where the first set of images includes an image captured by each image capturing device in the carriage prior to the door opening time, and the second set of images includes an image captured by each image capturing device in the carriage subsequent to the door closing time; and acquiring, by the server, the number of on-board people and the number of off-board people during the door opening and closing process according to the first set of images and the second set of images.

In a second aspect of the present disclosure, a vehicle passenger flow statistical apparatus is provided, including:

an acquiring module, configured to: acquire door opening time and door closing time of a vehicle during any one door opening and closing process of door opening and closing processes in a pending statistical period; acquire a first set of images and a second set of images in a carriage of the vehicle according to the door opening time and the door closing time, where the first set of images includes an image captured by each image capturing device in the carriage prior to the door opening time, and the second set of images includes an image captured by each image capturing device in the carriage subsequent to the door closing time; and a processing module, configured to acquire the number of on-board people and the number of off-board people during the door opening and closing process according to the first set of images and the second set of images.

In a third aspect of the present disclosure, a vehicle passenger flow statistical device is provided, including:

a memory;
a processor; and
a computer program;

where the computer program is stored in the memory, and configured to be executed by the processor to implement the method as described according to the first aspect.

In a fourth aspect of the present disclosure, a computer readable storage medium having a computer program stored thereon is provided, where the computer program implements the method as described according to the first aspect when executed by a processor.

With the vehicle passenger flow statistical method, the apparatus, the device and the storage medium provided in the present disclosure, door opening time and door closing time of a vehicle during any one door opening and closing process of door opening and closing processes in a pending statistical period is acquired through a server; a first set of images and a second set of images in a carriage of the vehicle is acquired according to the door opening time and the door closing time, where the first set of images includes an image captured by each image capturing device in the carriage prior to the door opening time, and the second set of images includes an image captured by each image capturing device in the carriage subsequent to the door closing time; and the number of on-board people and the number of off-board people during the door opening and closing process are acquired according to the first set of images and the second set of images. In this embodiment, a differentiated passenger is acquired according to sets of images collected prior to and subsequent to door opening and closing of a vehicle so that on-board and off-board situations of passengers during a door opening and closing process can be more accurately obtained, which can improve efficiency and accuracy of passenger flow statistics according to which an operation plan of the vehicle may be optimized timely and effectively.

BRIEF DESCRIPTION OF DRAWINGS

In order to illustrate technical solutions in embodiments of the present disclosure or the prior art more clearly, accompanying drawings used for description of the embodiments of the present disclosure or the prior art will be briefly described hereunder. Obviously, the described drawings merely illustrate some embodiments of present disclosure. For persons of ordinary skill in the art, other drawings may be obtained based on these drawings without any creative effort.

DESCRIPTION OF EMBODIMENTS

The technical solutions in the embodiments of the present disclosure will be described hereunder clearly and comprehensively with reference to the accompanying drawings in the embodiments of the present disclosure. Obviously, the described embodiments are only a part of embodiments of the present disclosure, rather than all embodiments of the present disclosure. All other embodiments obtained by persons of ordinary skill in the art based on the embodiments of the present disclosure without any creative effort shall fall into the scope of the present disclosure.

Figure 1:
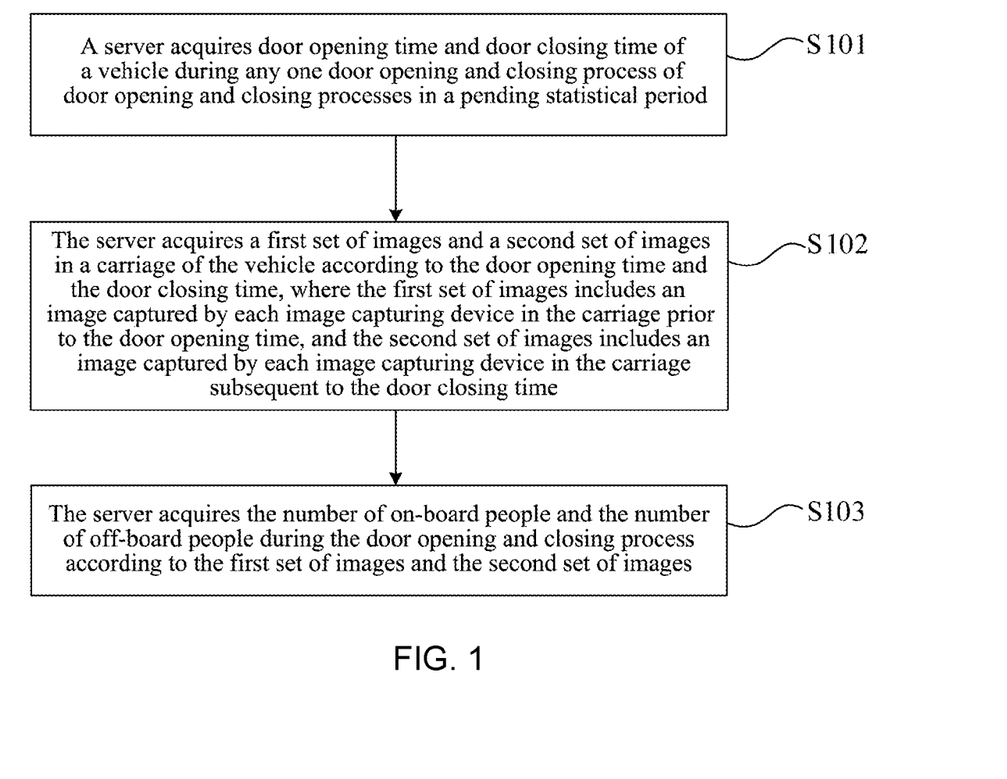
FIG. 1 is a flowchart of a vehicle passenger flow statistical method according to an embodiment of the present disclosure.

FIG. 1 is a flowchart of a vehicle passenger flow statistical method according to an embodiment of the present disclosure. This embodiment provides a vehicle passenger flow statistical method, of which the executive subject is a server. The method has specific steps as follows:

S101: a server acquires door opening time and door closing time of a vehicle during any one door opening and closing process of door opening and closing processes in a pending statistical period.

In this embodiment, the vehicle may be a public transportation such as a bus, a subway, a train and the like, which may of course be a pilotless vehicle (such as a pilotless bus). The vehicle records door opening time and door closing time during each door opening and closing process, and reports same to a server. Certainly, the server may initiatively acquire it from the vehicle.

S102: the server acquires a first set of images and a second set of images in a carriage of the vehicle according to the door opening time and the door closing time, where the first set of images includes an image captured by each image capturing device in the carriage prior to the door opening time, and the second set of images includes an image captured by each image capturing device in the carriage subsequent to the door closing time.

In this embodiment, at least one image capturing device (such as a camera) may be provided in the carriage of the vehicle, and image capturing may be performed in the carriage from various angles, for example, a camera is provided respectively in the front carriage, the rear carriage, and the middle carriage. The camera in the front carriage is oriented rearward to capture an image of the rear carriage, and the camera in the rear carriage is oriented forward to capture an image of the front carriage. The image capturing device may capture an image in the carriage in real time, or may capture once per a predetermined time interval, or may capture at a specific time (for example, capture only prior to door opening and subsequent to door closing). In this embodiment, after acquiring door opening time and door closing time of the vehicle during a certain door opening and closing process, the server acquires, according to the door opening time and the door closing time, images captured by an image capturing device in a carriage, including the first set of images captured by each image capturing device prior to the door opening time and the second set of images captured by each image capturing device subsequent to the door closing time.

S103: the server acquires the number of on-board people and the number of off-board people during the door opening and closing process according to the first set of images and the second set of images.

In this embodiment, the server may analyze the first set of images and the second set of images to acquire the number of on-board people and the number of off-board people during this door opening and closing process.

Figure 2:
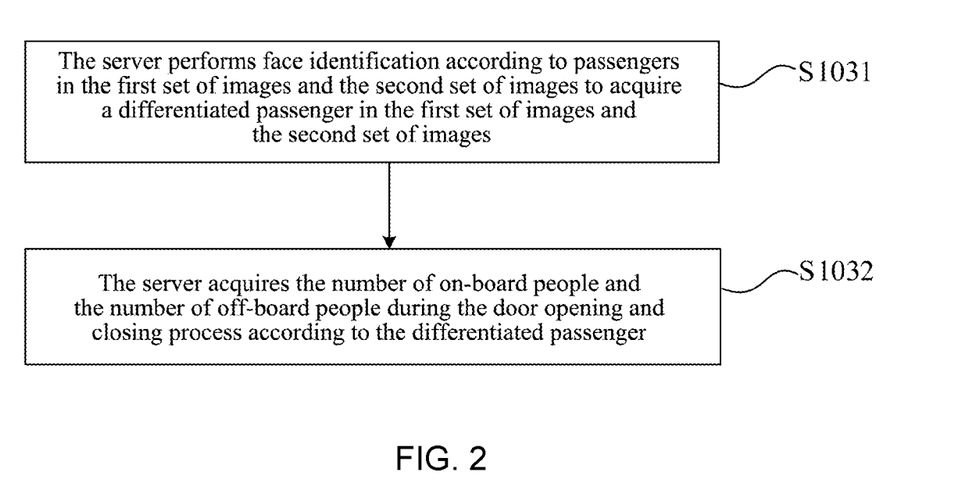
FIG. 2 is a flowchart of a vehicle passenger flow statistical method according to another embodiment of the present disclosure.

More specifically, the step as described in S103 in which the server acquires the number of on-board people and the number of off-board people during the door opening and closing process according to the first set of images and the second set of images, as shown in FIG. 2, may specifically include:

S1031: the server performs face identification according to passengers in the first set of images and the second set of images to acquire a differentiated passenger in the first set of images and the second set of images; and S1032: the server acquires the number of on-board people and the number of off-board people during the door opening and closing process according to the differentiated passenger.

In this embodiment, the server may perform face identification on passengers in the first set of images and the second set of images to acquire passenger identifiers, or configure a passenger identifier for each identified passenger, for example, perform face identification on each image in the first set of images to acquire passengers 001 and 002 prior to the door opening of the vehicle, and perform face identification on each image in the second set of images to acquire passengers 002 and 003 subsequent to the door closing of the vehicle, at this point, the differentiated passenger acquired includes 001 and 003, that is, during this door opening and closing process, the passenger 001 is off board and the passenger 003 is on board. In addition, in this embodiment, passenger identification may also be performed based on shapes of human heads and shoulders, and features of head and shoulder shapes of each passenger in the image may be extracted to perform identification. For a specific identification method, details will not be described herein again.

Further, the server acquires a total number of on-board people and a total number of off-board people in the pending statistical period according to the number of on-board people and the number of off-board people during each door opening and closing process in the pending statistical period.

In this embodiment, the same processing is performed for each door opening and closing process in the pending statistical period (for example, within one day) using the above process, where the number of on-board people and the number of off-board people during each door opening and closing process are acquired and statistics is performed, so that a total number of on-board people and a total number of off-board people in the pending statistical period are acquired, and then passenger flow statistics may be performed in the pending statistical period.

It should be noted that the door opening time and the door closing time in the above embodiment may also be replaced with vehicle arrival time and vehicle departure time.

With the vehicle passenger flow statistical method provided in this embodiment, door opening time and door closing time of a vehicle during any one door opening and closing process of door opening and closing processes in a pending statistical period is acquired through a server; a first set of images and a second set of images in a carriage of the vehicle is acquired according to the door opening time and the door closing time, where the first set of images includes an image captured by each image capturing device in the carriage prior to the door opening time, and the second set of images includes an image captured by each image capturing device in the carriage subsequent to the door closing time; and the number of on-board people and the number of off-board people during the door opening and closing process are acquired according to the first set of images and the second set of images. In this embodiment, a differentiated passenger is acquired according to sets of images collected prior to and subsequent to door opening and closing so that on-board and off-board situations of passengers during a door opening and closing process can be more accurately obtained, which can improve efficiency and accuracy of passenger flow statistics according to which an operation plan of the vehicle may be optimized timely and effectively.

Figure 3:
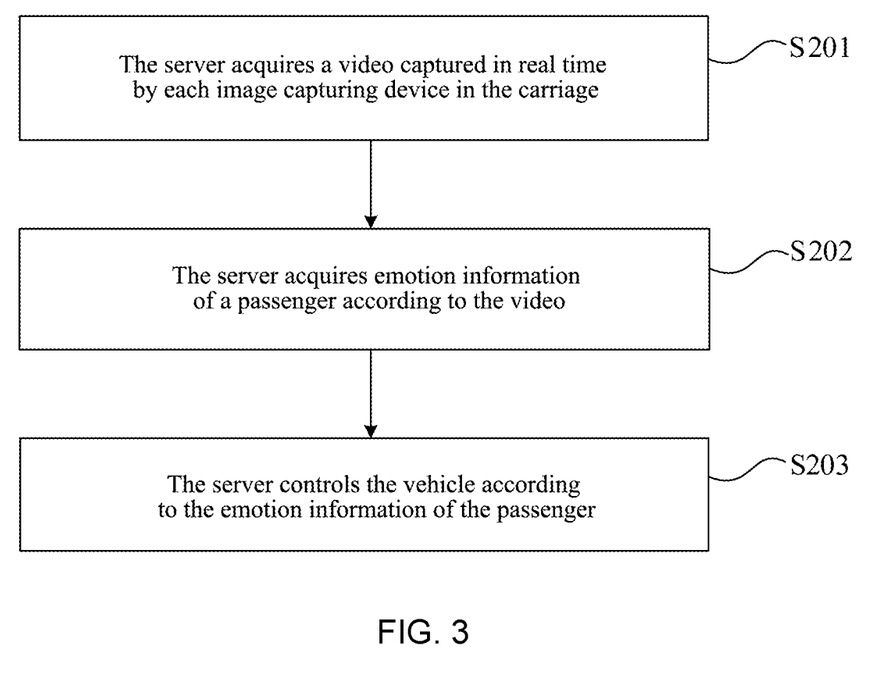
FIG. 3 is a flowchart of vehicle passenger flow statistical method according to another embodiment of the present disclosure.

On the basis of the foregoing embodiments, as shown in FIG. 3, the method provided in this embodiment may further include:

S201: the server acquires a video captured in real time by each image capturing device in the carriage;

S202: the server acquires emotion information of a passenger according to the video; and S203: the server controls the vehicle according to the emotion information of the passenger.

In this embodiment, vehicle operation may also be optimized according to the passenger's emotion. Specifically, the server may acquire a video captured in real time by each image capturing device in the carriage, and then perform image analysis on the video to acquire the emotion information of the passenger so that the vehicle is timely controlled according to the emotion information of the passenger to prevent the passenger from affecting the operation of the vehicle due to an abnormal emotion.

More specifically, the step as described in S202 in which the server acquires the emotion information of the passenger according to the video may specifically include:

S2021: the server acquires a key frame in the video;

S2022: the server extracts an emotion feature of the passenger in the key frame, where the emotion feature includes an expression and/or a behavior; and S2023: the server inputs the emotion feature into an emotion analyzing model to acquire the emotion information of the passenger.

In this embodiment, the key frame of the video is first acquired, where the key frame is a video frame that reflects main information content of the video, and the key frame in the video may be extracted by a method in the prior art, for example, for a content-based analyzing method, the key frame is selected according to a content change in the video, and so on. After the key frame is acquired, the emotion feature of the passenger, including the expression and/or the behavior, is extracted based on the key frame, and then input into a pre-acquired emotion analyzing model to acquire the emotion information of the passenger. The emotion analyzing model may be a neural network model for which the neural network may be trained through deep learning.

Further, the emotion information includes a parameter characterizing an abnormal emotion, for example, the degree of emotional abnormality of the passenger may be characterized by 0-100%, where 100% is extremely abnormal.

Further, the step as described in S203 in which the server controls the vehicle according to the emotion information of the passenger may specifically include:

the server determines whether the parameter characterizing the abnormal emotion is greater than a first preset threshold, and transmits a deceleration or stop instruction to the vehicle if the parameter characterizing the abnormal emotion is greater than the first preset threshold; and the server determines whether the parameter characterizing the abnormal emotion is greater than a second preset threshold if the parameter characterizing the abnormal emotion is not greater than the first preset threshold, and if the parameter characterizing the abnormal emotion is greater than the second preset threshold, transmits alert information to enable an operator to monitor the passenger in real time according to the alert information.

In this embodiment, when it is determined that the parameter characterizing the abnormal emotion of a certain passenger is greater than the first preset threshold (for example, 90%), it is then determined that there is a high probability of the passenger threatening a normal operation of the vehicle, and thus the deceleration or stop instruction may be transmitted to the vehicle. The vehicle may automatically decelerate or stop according to the deceleration or stop instruction. Certainly, the vehicle may also be controlled by a driver or a security officer therein according to the deceleration or stop instruction. When it is determined that the parameter characterizing the abnormal emotion of a certain passenger is not greater than the first preset threshold but greater than the second preset threshold (for example, 60%), it indicates that there is a certain probability of the passenger threatening the normal operation of the vehicle, and thus the alert information may be transmitted to enable a remote operator or an operator in the vehicle (a driver or a security officer) to monitor the passenger in real time so that the vehicle is controlled in time when the passenger threatens the normal operation of the vehicle.

Further, when performing the face identification according to the passengers in the first set of images and the second set of images to acquire the differentiated passenger in the first set of images and the second set of images as described in S1031, the server determines whether the passenger that is monitored in real time as described above belongs to the differentiated passenger, that is, determine whether the passenger gets off the vehicle, and if it is determined that the passenger has got off the vehicle, the passenger is released from being monitored in real time.

In addition, statistics of the emotion information of the on-board and off-board passengers may also be conducted in this embodiment, that is, the emotion information of a certain passenger during on-board and off-board is acquired, and an emotional change of the passenger during the ride is acquired to facilitate optimization of the vehicle operation according to the emotional change of the passenger during the ride as well as to improve service quality.

Figure 4:
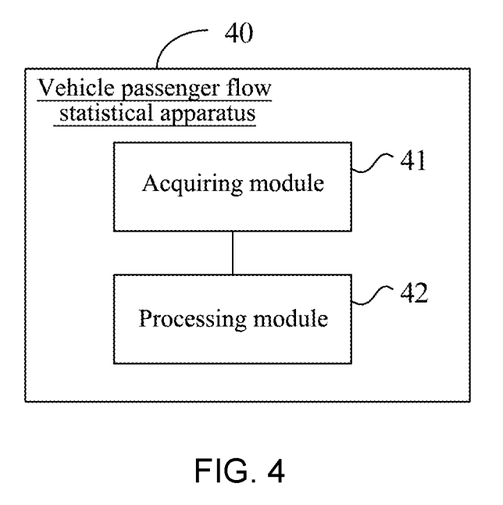
FIG. 4 is a structural diagram of a vehicle passenger flow statistical apparatus according to an embodiment of the present disclosure.

FIG. 4 is a structural diagram of a vehicle passenger flow statistical apparatus according to an embodiment of the present disclosure. The vehicle passenger flow statistical apparatus provided in this embodiment may perform a process flow provided in the embodiments of the vehicle passenger flow statistical method. As shown in FIG. 4, the vehicle passenger flow statistical apparatus 40 includes an acquiring module 41 and a processing module 42.

The acquiring module 41 is configured to: acquire door opening time and door closing time of a vehicle during any one door opening and closing process of door opening and closing processes in a pending statistical period; acquire a first set of images and a second set of images in a carriage of the vehicle according to the door opening time and the door closing time, where the first set of images includes an image captured by each image capturing device in the carriage prior to the door opening time, and the second set of images includes an image captured by each image capturing device in the carriage subsequent to the door closing time.

The processing module 42 is configured to acquire the number of on-board people and the number of off-board people during the door opening and closing process according to the first set of images and the second set of images.

Further, the processing module 42 is configured to:

perform face identification according to passengers in the first set of images and the second set of images to acquire a differentiated passenger in the first set of images and the second set of images; and acquire the number of on-board people and the number of off-board people during the door opening and closing process according to the differentiated passenger.

Further, the processing module 42 is further configured to:

acquire a total number of on-board people and a total number of off-board people in the pending statistical period according to the number of on-board people and the number of off-board people during each door opening and closing process in the pending statistical period.

Further, the acquiring module 41 is further configured to acquire a video captured in real time by each image capturing device in the carriage; and the processing module 42 is further configured to: acquire emotion information of a passenger according to the video; and control the vehicle according to the emotion information of the passenger.

Further, the processing module 42 is configured to:

acquire a key frame in the video;

extract an emotion feature of the passenger in the key frame, where the emotion feature includes an expression and/or a behavior; and input the emotion feature into an emotion analyzing model to acquire the emotion information of the passenger.

Further, the emotion information includes a parameter characterizing an abnormal emotion;

the processing module 42 is configured to:

determine whether the parameter characterizing the abnormal emotion is greater than a first preset threshold, and transmit a deceleration or stop instruction to the vehicle if the parameter characterizing the abnormal emotion is greater than the first preset threshold; and determine whether the parameter characterizing the abnormal emotion is greater than a second preset threshold if the parameter characterizing the abnormal emotion is not greater than the first preset threshold, and if the parameter characterizing the abnormal emotion is greater than the second preset threshold, transmit alert information to enable an operator to monitor the passenger in real time according to the alert information.

The vehicle passenger flow statistical apparatus provided in the embodiment of the present disclosure may be specifically configured to perform the method embodiments provided above in FIG. 1 to FIG. 3, and the implementation principles and the produced technical effects thereof are the same as those of the foregoing method embodiments. Reference may be made to corresponding contents in the foregoing method embodiments, and details will not be described herein again.

With the vehicle passenger flow statistical apparatus provided in the embodiments of the present disclosure, door opening time and door closing time of a vehicle during any one door opening and closing process of door opening and closing processes in a pending statistical period is acquired through a server; a first set of images and a second set of images in a carriage of the vehicle is acquired according to the door opening time and the door closing time, where the first set of images includes an image captured by each image capturing device in the carriage prior to the door opening time, and the second set of images includes an image captured by each image capturing device in the carriage subsequent to the door closing time; and the number of on-board people and the number of off-board people during the door opening and closing process are acquired according to the first set of images and the second set of images. In this embodiment, a differentiated passenger is acquired according to sets of images collected prior to and subsequent to door opening and closing so that on-board and off-board situations of passengers during a door opening and closing process can be more accurately obtained, which can improve efficiency and accuracy of passenger flow statistics according to which an operation plan of the vehicle may be optimized timely and effectively.

Figure 5:
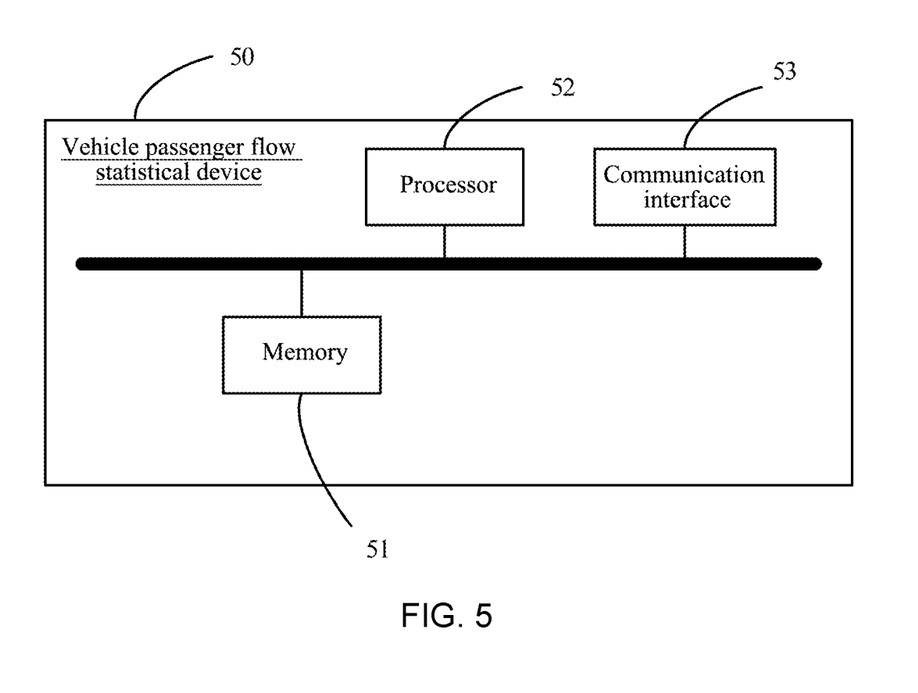
FIG. 5 is a structural diagram of a vehicle passenger flow statistical device according to an embodiment of the present disclosure.

FIG. 5 is a structural diagram of a vehicle passenger flow statistical device according to an embodiment of the present disclosure. The vehicle passenger flow statistical device provided in the embodiment of the present disclosure may perform a process flow provided in the embodiments of the vehicle passenger flow statistical method. As shown in FIG. 5, the vehicle passenger flow statistical device 50 includes a memory 51, a processor 52, a computer program, and a communication interface 53, where the computer program is stored in the memory 51, and configured to be executed by the processor 52 to implement the vehicle passenger flow statistical method described in the above embodiments.

The vehicle passenger flow statistical device provided in the embodiment as shown in FIG. 5 may be configured to perform the technical solutions of the foregoing method embodiments; and implementation principles and technical effects thereof are similar to those of the foregoing method embodiments, for which details will not be described herein again.

In addition, this embodiment further provides a computer readable storage medium having a computer program stored thereon, where the computer program is executed by a processor to implement the vehicle passenger flow statistical method described in the above embodiments.

In several embodiments provided in the present disclosure, it should be understood that the disclosed apparatus and method may be implemented in other manners. For example, the described apparatus embodiments are merely exemplary. For example, the division of the units is merely a division of logical functions and there may be other divisions during actual implementations. For example, a plurality of units or components may be combined or integrated into another system, or some features may be omitted or not performed. In addition, the presented or discussed mutual couplings or direct couplings or communication connections may be indirect couplings or communication connections through some interfaces, apparatuses or units and may be implemented in electronic, mechanical, or other forms.

The units described as separate parts may or may not be physically separate, and parts shown as units may or may not be physical units, that is, may be located in one position, or may be distributed on a plurality of network units. A part or all of the units may be selected according to actual needs to achieve the objectives of the scheme in the embodiments of the present disclosure.

In addition, functional units in the embodiments of the present disclosure may be integrated into one processing unit, or each of the units may exist alone physically, or two or more units are integrated into one unit. The above integrated unit may be implemented in a form of hardware or in a form of hardware plus a software functional unit.

The integrated unit implemented in the form of a software functional unit as described above may be stored in a computer readable storage medium. The above software functional unit is stored in a storage medium, and includes several instructions for enabling a computer device (which may be a personal computer, a server, or a network device, etc.) or a processor to perform a part of steps of the method described in the embodiments of the present disclosure. The foregoing storage medium includes: any medium that can store program codes, such as a USB flash disk, a mobile hard disk, a Read-Only Memory (ROM), a Random Access Memory (RAM), a magnetic disk, or an optical disc, etc.

It may be clearly understood by persons skilled in the art that, for the purpose of convenient and brief description, division of the described functional modules is merely described for illustrations, in practical use, the described functions may be assigned as desired to different functional modules to implement, that is, the internal structure of the apparatus is divided into different functional modules to implement all or a part of functions as described above. For a detailed working process of the described apparatus, reference may be made to corresponding process in the foregoing method embodiments, and details will not be described herein again.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions of the embodiments of the present disclosure.

What is claimed is:

1. A method for controlling an operation of a vehicle, comprising:
receiving, by a server, door opening time and door closing time of a vehicle during any one door opening and closing process of door opening and closing processes in a pending statistical period from the vehicle;
acquiring, by the server, a video captured in real time by each image capturing device in a carriage, and performing image analysis on the video to acquire a first set of images and a second set of images in the carriage of the vehicle according to the door opening time and the door closing time, wherein the first set of images comprises an image captured by each image capturing device in the carriage prior to the door opening time, and the second set of images comprises an image captured by each image capturing device in the carriage subsequent to the door closing time;
performing, by the server, face identification according to passengers in the first set of images and the second set of images, and configuring a passenger identifier for each identified passenger;
determining, by the server, a different passenger identifier between passenger identifiers of the first set of images and the second set of images, and acquiring a differentiated passenger corresponding to the different passenger identifier;
acquiring, by the server, a number of on-board people and a number of off-board people during the door opening and closing process according to the differentiated passenger; and
controlling, by the server, the operation of the vehicle according to the number of on-board people and the number of off-board people during the door opening and closing process.

2. The method according to claim 1, wherein after the acquiring the number of on-board people and the number of off-board people during the door opening and closing process, the method further comprises:
acquiring, by the server, a total number of on-board people and a total number of off-board people in the pending statistical period according to the number of on-board people and the number of off-board people during each door opening and closing process in the pending statistical period.

3. The method according to claim 1, further comprising:
acquiring, by the server, emotion information of a passenger according to the video; and
controlling, by the server, the vehicle according to the emotion information of the passenger.

4. The method according to claim 3, wherein the acquiring, by the server, emotion information of a passenger according to the video comprises:
acquiring, by the server, a key frame in the video;
extracting, by the server, an emotion feature of the passenger in the key frame, wherein the emotion feature comprises an expression and/or a behavior; and
inputting, by the server, the emotion feature into an emotion analyzing model to acquire the emotion information of the passenger.

5. The method according to claim 3, wherein the emotion information comprises a parameter characterizing an abnormal emotion;
the controlling, by the server, the vehicle according to the emotion information of the passenger comprises:
determining, by the server, whether the parameter characterizing the abnormal emotion is greater than a first preset threshold, and transmitting a deceleration or stop instruction to the vehicle if the parameter characterizing the abnormal emotion is greater than the first preset threshold; and
determining, by the server, whether the parameter characterizing the abnormal emotion is greater than a second preset threshold if the parameter characterizing the abnormal emotion is not greater than the first preset threshold, and if the parameter characterizing the abnormal emotion is greater than the second preset threshold, transmitting alert information to enable an operator to monitor the passenger in real time according to the alert information.

6. A system, comprising: a processor, and a memory for storing a computer program which, when executed by the processor, causes the processor to:
receive door opening time and door closing time of a vehicle during any one door opening and closing process of door opening and closing processes in a pending statistical period from the vehicle; acquire a video captured in real time by each image capturing device in a carriage, and perform image analysis on the video to acquire a first set of images and a second set of images in the carriage of the vehicle according to the door opening time and the door closing time, wherein the first set of images comprises an image captured by each image capturing device in the carriage prior to the door opening time, and the second set of images comprises an image captured by each image capturing device in the carriage subsequent to the door closing time;

perform face identification according to passengers in the first set of images and the second set of images, and configure a passenger identifier for each identified passenger;

determine a different passenger identifier between passenger identifiers of the first set of images and the second set of images, and acquire a differentiated passenger corresponding to the different passenger identifier;

acquire a number of on-board people and a number of off-board people during the door opening and closing process according to the differentiated passenger; and control the operation of the vehicle according to the number of on-board people and the number of off-board people during the door opening and closing process.

7. The system according to claim 6, wherein the computer program further causes the processor to:

acquire a total number of on-board people and a total number of off-board people in the pending statistical period according to the number of on-board people and the number of off-board people during each door opening and closing process in the pending statistical period.

8. The system according to claim 6, wherein the computer program further causes the processor to:

acquire emotion information of a passenger according to the video; and control the vehicle according to the emotion information of the passenger.

9. The system according to claim 8, wherein the computer program further causes the processor to:

acquire a key frame in the video;

extract an emotion feature of the passenger in the key frame, wherein the emotion feature comprises an expression and/or a behavior; and input the emotion feature into an emotion analyzing model to acquire the emotion information of the passenger.

10. The system according to claim 8, wherein the emotion information comprises a parameter characterizing an abnormal emotion;

the computer program further causes the processor to:

determine whether the parameter characterizing the abnormal emotion is greater than a first preset threshold, and transmit a deceleration or stop instruction to the vehicle if the parameter characterizing the abnormal emotion is greater than the first preset threshold; and determine whether the parameter characterizing the abnormal emotion is greater than a second preset threshold if the parameter characterizing the abnormal emotion is not greater than the first preset threshold, and if the parameter characterizing the abnormal emotion is greater than the second preset threshold, transmit alert information to enable an operator to monitor the passenger in real time according to the alert information.

11. A non-transitory computer readable storage medium having a computer program stored thereon, wherein the computer program implements a method for controlling an operation of a vehicle, the method comprising:

receiving, by a server, door opening time and door closing time of a vehicle during any one door opening and closing process of door opening and closing processes in a pending statistical period from the vehicle;

acquiring, by the server, a video captured in real time by each image capturing device in a carriage, and performing image analysis on the video to acquire a first set of images and a second set of images in the carriage of the vehicle according to the door opening time and the door closing time, wherein the first set of images comprises an image captured by each image capturing device in the carriage prior to the door opening time, and the second set of images comprises an image captured by each image capturing device in the carriage subsequent to the door closing time;

performing, by the server, face identification according to passengers in the first set of images and the second set of images, and configuring a passenger identifier for each identified passenger;

determining, by the server, a different passenger identifier between passenger identifiers of the first set of images and the second set of images, and acquiring a differentiated passenger corresponding to the different passenger identifier;

acquiring, by the server, a number of on-board people and a number of off-board people during the door opening and closing process according to the differentiated passenger; and controlling, by the server, the operation of the vehicle according to the number of on-board people and the number of off-board people during the door opening and closing process.

* * * * *